United States Patent [19]

Suzuki

[11] Patent Number: 5,049,903

[45] Date of Patent: Sep. 17, 1991

[54] THERMAL TRANSFER MATERIAL

[75] Inventor: Takayuki Suzuki, Saitama, Japan

[73] Assignee: Canon Kabushiki Kaisha, Tokyo, Japan

[21] Appl. No.: 367,482

[22] Filed: Jun. 16, 1989

[30] Foreign Application Priority Data

Jun. 17, 1988 [JP] Japan ............................... 63-149879

[51] Int. Cl.[5] ........................ G01D 9/00; G01D 15/10

[52] U.S. Cl. ............................ 346/135.1; 346/76 PH; 428/913

[58] Field of Search ........................ 346/76 PH, 135.1; 428/913

[56] References Cited

U.S. PATENT DOCUMENTS 4,707,707 11/1987 Ohno ............................ 346/76 PH

*Primary Examiner*—Benjamin R. Fuller

*Assistant Examiner*—Gerald E. Preston

*Attorney, Agent, or Firm*—Fitzpatrick, Cella, Harper & Scinto

[57] ABSTRACT

A thermal transfer material, comprising a support and an ink layer disposed thereon which comprises a binder and a colorant wherein the binder has a melt viscosity ($\eta$ poise) satisfying the following formula:

$$1.9\times 10^{13}.e^{-0.26T} \leqq \eta \leqq 4.8\times 10^{17}.e^{-0.26T},$$

wherein T denotes a temperature (°C.) and e denoted the base of natural logarithm, in the range of 50°-150° C.

6 Claims, 5 Drawing Sheets

THERMAL TRANSFER MATERIAL

FIELD OF THE INVENTION AND RELATED ART

The present invention relates to a thermal transfer material for use in a thermal transfer recording method, particularly to a thermal transfer material capable of providing good recorded images even when used in a smaller amount than that in the conventional recording.

The thermal or heat-sensitive transfer recording method has recently been widely used because it has general advantages of the thermal recording method such that the apparatus employed is light in weight, compact, free of noise, excellent in operability and adapted to easy maintenance, and also has other advantages such that it does not require a color-formation type converted paper but provides recorded images with excellent durability.

However, in the conventional thermal transfer recording method, since the heat-transferable ink layer of a thermal transfer material is nearly completely transferred to a recording medium (or medium to be recorded) after one heat application, the thermal transfer material is discarded after a single use, whereby the running cost becomes high. Further, the conventional thermal transfer material has a disadvantage such that secrets can be leaked out from the used thermal transfer material.

On the other hand, there have been proposed a large number of methods wherein one thermal transfer material is repeatedly used plural times as disclosed in Japanese Laid-Open Patent Application (KOKAI) No. 105579/1980, or a thermal transfer material has a relative velocity with respect to a recording medium so that the amount of the thermal transfer material to be used may be reduced, as described in Japanese Laid-Open Patent Application (KOKAI) Nos. 83471/1982 and 7377/1983. However, these methods only provide recorded images, e.g., one having unevenness in image density, which are inferior in image quality to those provided by the above-mentioned conventional thermal transfer recording method. Accordingly, the resultant images are insufficient in view of practical use.

SUMMARY OF THE INVENTION

An object of the present invention is to solve the above-mentioned problems encountered in the prior art.

A specific object of the present invention is to provide a thermal transfer material which is capable of providing a recorded image of good quality, while retaining various advantages of the thermal transfer recording method, even when used in a recording method wherein the thermal transfer material has a relative velocity with respect to a recording medium (hereinafter, simply referred to as "double density recording").

As a result of earnest study, I have found that, in order to enhance the sensitivity of an ink layer to second heat application et. seq. while preventing ground staining or soiling on a recording medium which can occur in the double density recording due to the relative velocity between the thermal transfer material and the recording medium, it is very important that the binder of the ink layer shows what kind of a series of melt viscosities (i.e., what kind of a change in melt viscosity) in a specific temperature range. Further, I have found it very important that the above-mentioned series of melt viscosities relate to specific exponential relationships.

The thermal transfer material according to the present invention is based on the above-mentioned discovery and comprises: a support and an ink layer disposed thereon which comprises a binder and a colorant; said binder having a melt viscosity ($\eta$ poise) satisfying the following formula:

$$1.9\times 10^{13}\cdot e^{-0.26T} \leq \eta \leq 4.8\times 10^{17}\cdot e^{-0.26T},$$

wherein T denotes a temperature (°C.) and e denotes the base of natural logarithm, in the range of 50–150° C.

The presentn invention also provides a thermal transfer recording method, comprising:

providing a thermal transfer material according to claim 1;

causing the thermal transfer material to contact a recording medium with its ink layer side;

supplying a pattern of energy from a recording head to the thermal transfer material; and separating the thermal transfer material from the recording medium to leave a transferred image on the recording medium;

wherein the thermal transfer material moves in a unit period of time through a length of distance relative to the recording head, which is smaller than the length of distance relative to the recording head through which the recording medium moves in the same period of time.

These and other objects, features and advantages of the present invention will become more apparent upon a consideration of the following description of the preferred embodiments of the present invention taken in conjunction with the accompanying drawings, wherein like parts are denoted by like reference numerals. In the description appearing hereinafter, "part(s)" and "%" used for describing quantities are by weight unless otherwise noted specifically.

DETAILED DESCRIPTION OF THE INVENTION

Figure 2:
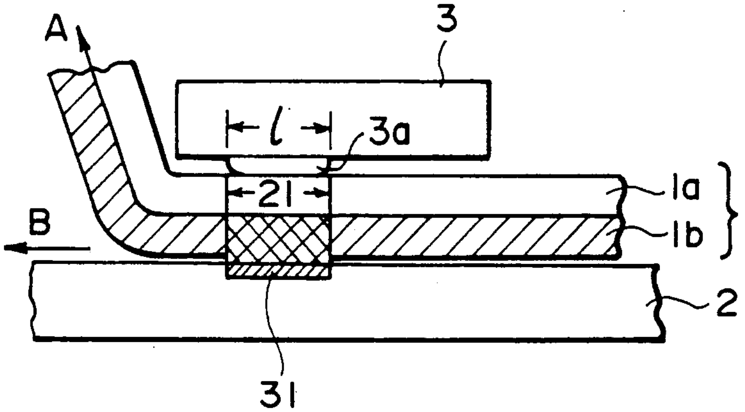
FIGS. 2 to 5 show partial schematic side sectional views showing a recording method wherein an embodiment of the thermal transfer material according to the present invention is used for double density recording.

Referring to FIG. 2, the thermal transfer material 1 according to the present invention comprises a support 1_a_ and a heat-fusible (or heat-transferable) ink layer 1_b_ disposed thereon.

Figure 1:
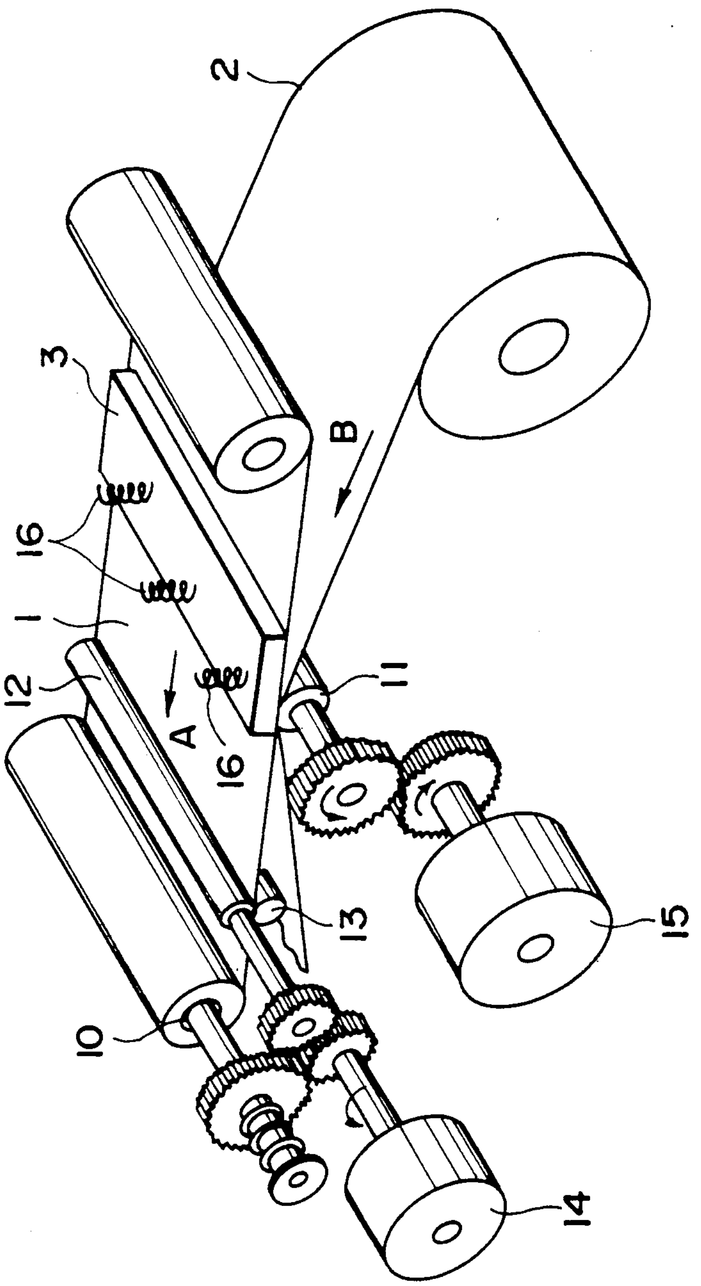
FIG. 1 is a schematic perspective view showing an apparatus for using the thermal transfer material according to the present invention.

FIG. 1 shows an apparatus for practicing an embodiment (i.e., double density recording method) of the thermal transfer recording method using the thermal transfer material according to the present invention.

Referring to FIG. 1, in such a recording method, the thermal transfer material 1 of the present invention is superposed on a recording medium (or medium to be recorded) 2 such as paper so that the heat-fusible ink layer of the thermal transfer material 1 contacts the recording medium 2, and the thermal transfer material 1 is heated by means of a recording head 3 such as thermal head, whereby the heat-fusible ink layer is transferred to the recording medium 2 to provide thereon a recorded image. The thermal transfer material 1 is moved continuously or successively in the directions of an arrow A by the rotation of a capstan roller 12 and a pinch roller 13, while the recording medium 2 is moved continuously or successively in the direction of an arrow B by the rotation of a platen roller 11, whereby recording is successively effected on the recording medium 2. The capstan roller 12 and pinch roller 13 are driven by a motor 14, and the platen roller 11 is driven by a motor 15. The thus moved thermal transfer material 1 is wound up about a winding roller 10 driven by the motor 14. A spring 16 presses the recording head 3 on the platen roller 11 by the medium of the thermal transfer material 1 and the recording medium 2.

In the above-mentioned thermal transfer recording method, the thermal transfer material 1 has a relative velocity with respect to the recording medium 2. In the embodiment shown in FIG. 1, the recording head 3 is not moved while the thermal transfer material 1 is moved at a speed which is lower than that of the recording medium 2. In other words, when a length corresponding to the movement of the thermal transfer material 1 in a certain period of time is compared with that corresponding to the movement of the recording medium 2 in the same period of time, the former is smaller than the latter. As a result, in the above-mentioned recording method, the recording is effected as shown by FIGS. 2 to 5.

Referring to FIG. 2, when the width of the heat-generating member (or element) 3*a* of a recording head 3 in the moving direction of the thermal transfer material 1 (i.e., in the arrow A direction) is represented by 1, first heat application is effected on the length 1 (i.e., a portion 21) of the thermal transfer material 1 which had not been used at all. As a result, a transferred image 31 is formed on the recording medium 2.

Figure 3:
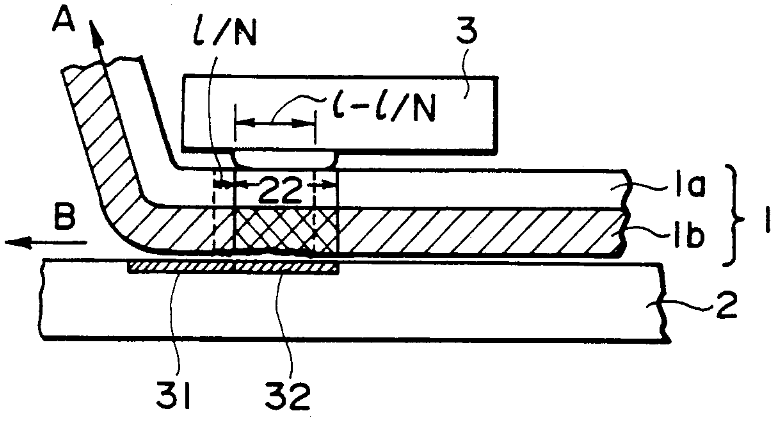

Referring to FIG. 3, at the time of second heat application, the recording medium 2 is moved through a length of 1 in the arrow B direction, while the thermal transfer material 1 is moved only through a length of 1/N. Accordingly, a portion of the thermal transfer material 1 corresponding to the length (1— 1/N), which has already been subjected to first head application, is again used. As a result, in FIG. 3, a portion 22 of the thermal transfer material 1 is subjected to heat application, whereby a transferred image 32 is formed on the recording medium 2.

Herein, the value of "N" is a positive integer ($N \geqq 2$) representing to the number of heat applications to which the same portion of the thermal transfer material 1 can be subjected. In the embodiment as shown in FIG. 2, the value of N is 5.

Figure 4:
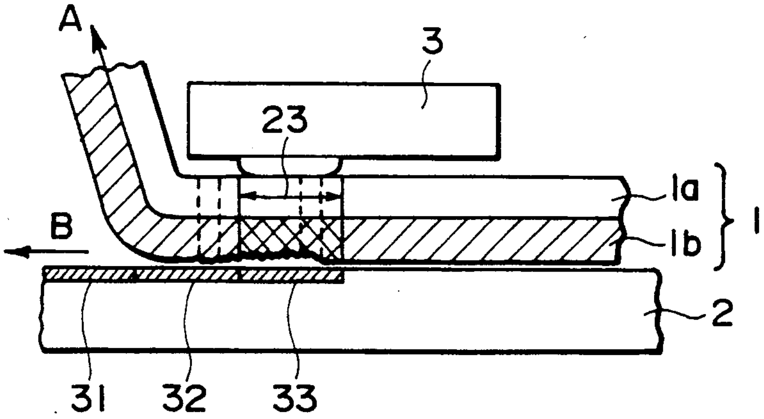
Figure 5:
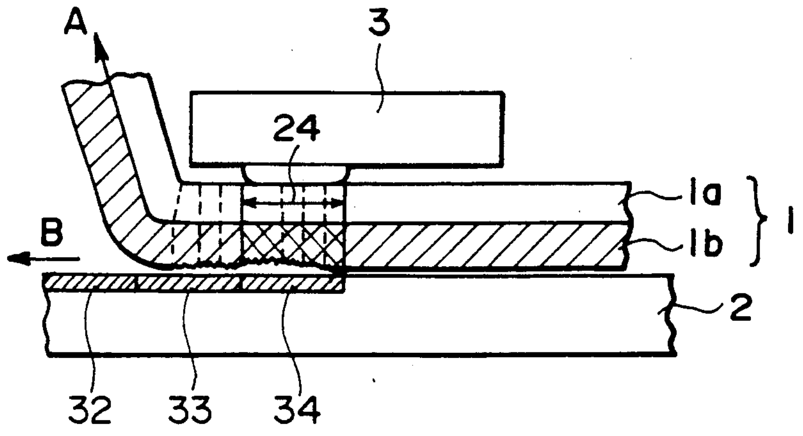

When heat applications are successively effected in such a manner along the longitudinal direction (i.e., the moving direction) of the thermal transfer material 1, at the time of heat application after the second heat application, only a portion of the thermal transfer material 1 corresponding to the length of 1/N is unused, and the other portion (at intervals of 1/N) which has already been subjected to heat application one or more times, is again subjected to heat application, as shown in FIGS. 3 to 5. More specifically, in FIG. 4, a portion 23 of the thermal transfer material 1 is subjected to heat application, whereby a transferred image 33 is formed on the recording medium 2. Further, in FIG. 5, a portion 24 of the thermal transfer material 1 is subjected to heat application, whereby a transferred image 34 is formed on the recording medium 2. In other words, the same portion of the thermal transfer material 1 is used N times, and the thermal transfer material 1 is moved while rubbing the surface of the recording medium 2.

In the above-mentioned embodiment, the thermal transfer material 1 is moved with respect to the recording head 3 at intervals of 1/N, when subjected to second and third heat applications. However, in order to reduce the consumption of the thermal transfer material 1, it is sufficient that the thermal transfer material 1 is moved at intervals each of which is smaller than 1 and not smaller than 1/N. Most effective recording may be effected when the length of travel of the thermal transfer material 1 is 1/N counted from the time of a heat application to that of the next heat application. The above-mentioned N may preferably be 2 to 10, more preferably 3 to 8.

While the recording head 3 is not moved in the above-mentioned embodiment, it is possible to move the recording head 3. Such an embodiment may be considered in the same manner as that explained with reference to FIGS. 1 to 5, when the lengths of travel of the thermal transfer material 1 and recording medium 2 are respectively defined as those counted from the recording head 3 on the basis of the position of the recording head 3. As described above, in the thermal transfer recording method of the present invention, the length through which the thermal transfer material 1 is moved with respect to the recording head 3 in a certain period of time is smaller than the length through which the recording medium 2 is moved with respect to the recording head 3 in the same period of time.

In a case where a thermal transfer material 1 is used for double density recording, when the melt viscosity of its ink layer 1*b* is too small, almost all the ink disposed in the range of 1 is transferred to a recording medium in a heat application corresponding to first dot, but the ink disposed in the range of 1/N is only transferred thereto in a heat application corresponding to second dot, et seq., whereby the image density decreases. Further, since the thermal transfer material 1 is rubbed with the surface of a recording medium while subjected to heat application, the ink of the thermal transfer material 1 is scraped with the front of convexity of the recording medium surface, and the ink is not transferred to the top of the convexity and a portion appearing thereafter. As a result, a decrease or unevenness in image density can occur. On the other hand, when the melt viscosity of the ink layer 1*b* is too large, the energy required for recording undesirably increases, e.g., in view of durability of a thermal head.

Figure 6:
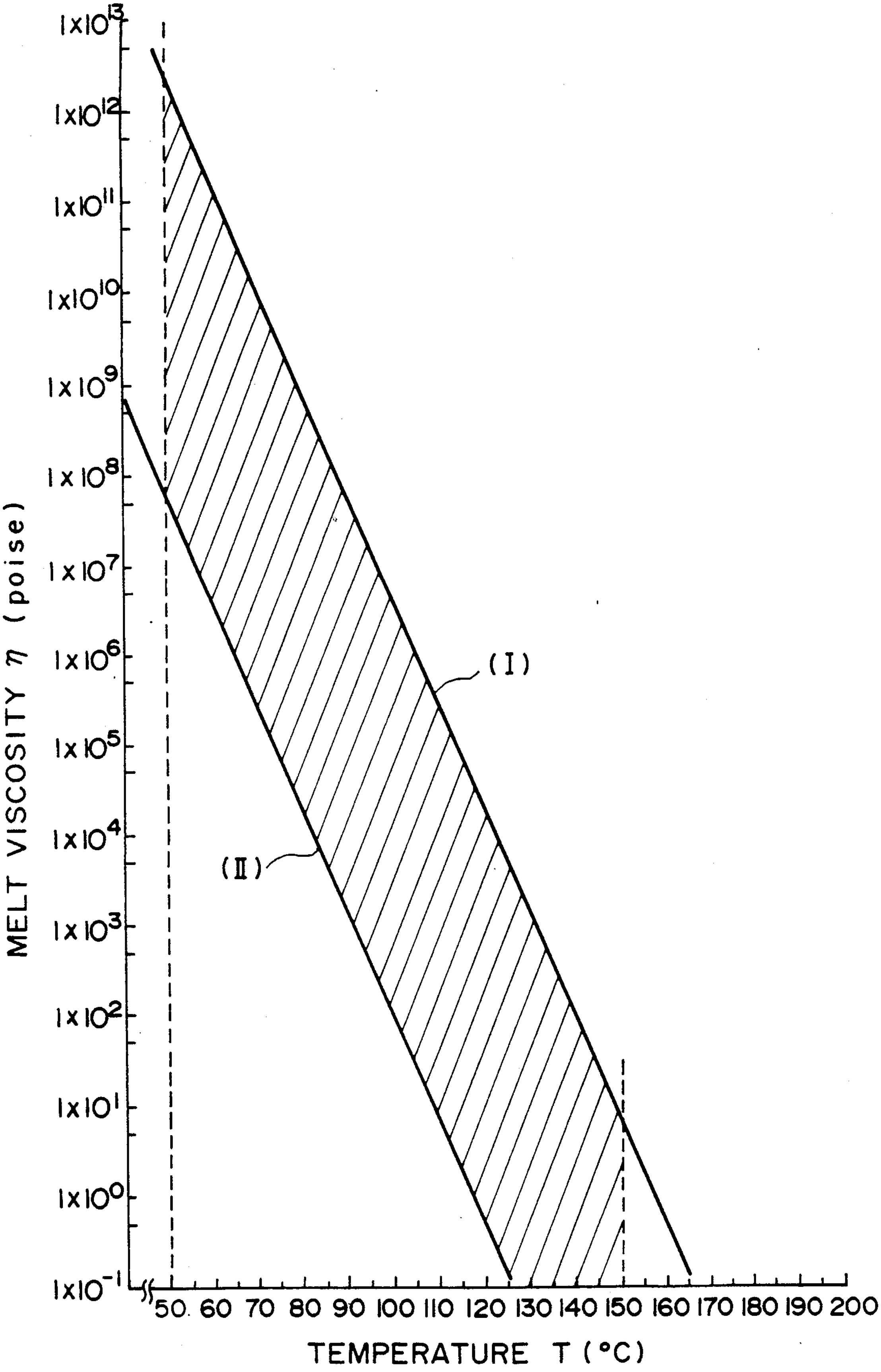
FIG. 6 is a graph showing a relationship between temperature and the melt viscosity of a binder.

In the thermal transfer material according to the present invention, the binder constituting the ink layer 1*b* is caused to have a melt viscosity represented by the range or region disposed between the graph (I) ($\eta = 4.8 \times 10^{17} \cdot e^{-0.26T}$) and the graph ($\eta = 1.9 \times 10^{13} \cdot e^{-0.26T}$), as shown in FIG. 6, whereby a recorded image of good quality is provided.

In the present invention, the melt viscosity $\eta$ of the above-mentioned binder may preferably satisfy a relationship of:

$$1.9\times 10^{13}\cdot e^{-0.26T} \leqq \eta \leqq 5\times 10^{16}\cdot e^{-0.26T}$$

More specifically, the binder used in the present invention may preferably provide a melt viscosity in the following range in each temperature range as described below.

| | |
|---|---|
| 50° C. | $5 \times 10^7 \leqq \eta \leqq 1 \times 10^{12}$ |
| | (preferably $5 \times 10^7 \leqq \eta \leqq 1 \times 10^{11}$) (poise) |
| 60° C. | $4 \times 10^8 \leqq \eta \leqq 8 \times 10^{10}$ |
| | (preferably $4 \times 10^6 \leqq \eta \leqq 8 \times 10^9$) |
| 110° C. | $8 \times 10^0 \leqq \eta \leqq 1 \times 10^5$ |
| | (preferably $8 \times 10^0 \leqq \eta \leqq 2 \times 10^4$) |
| 150° C. | $3 \times 10^{-4} \leqq \eta \leqq 5 \times 10^0$ |
| | (preferably $3 \times 10^{-4} \leqq \eta \leqq 6 \times 10^{-1}$) |

In the present invention, the melt viscosity of the binder constituting an ink layer is defined as an apparent viscosity $\eta$ which may be measured by means of Flow Tester CFT-500 (mfd. by Shimazu Seisakusho K.K.) under the following conditions:

Temperature increasing rate: 2° C./min.,

Extrusion pressure: 10 kgf/cm$^2$,

Die diameter: 0.5 mm, and

Die length: 1.0 mm.

Based on such a measurement, the apparent viscosity $\eta$is determined according to the following formula (1):

$$\eta = \frac{\pi r^4 P}{8 L Q'} \text{ [dyne} \cdot S/\text{cm}^2 = \text{Poise]}, \qquad (1)$$

wherein r represents the radius of the die (mm), L represents the length of the die (mm), P represents a test pressure (dyne/cm$^2$), and Q' represents a flow rate (ml/sec) detected by a detector.

Even in a case where the melt viscosity of a binder is in the region disposed between the above-mentioned graphs (I) and (II), when a binder which provides a melt viscosity (i.e., flows out in the above-mentioned measurement using the Flow Tester) at a temperature of below 50° C. is used in an ink layer, blocking, etc. may undesirably occur in the storage thereof. On the other hand, when a binder which does not provide a melt viscosity until the temperature exceeds 150° C. is used in an ink layer, the energy required for recording increases to undesirable affect the durability of a thermal head and recording speed.

Thus, in the thermal transfer material according to the present invention, the binder is caused to have a melt viscosity ($\eta$poise) satisfying: $1.9\times 10^{13}\cdot e^{-0.26T} \leqq \eta \leqq 4.8\times 10^{17}\cdot e^{-0.26T}$in the range of 50° to 150° C.

The thermal transfer material of the present invention may be obtained by forming an ink layer 1*b* on a support 1*a*, e.g., by coating. The ink layer 1*b* may comprise a binder and a colorant mixed therein.

Examples of the binder used in the ink layer 1*b* may include: waxes such as carnauba wax, paraffin wax, sasol wax, microcrystallin wax, and castor wax; higher fatty acids and their derivatives (including metal salts and esters) such as stearic acid, palmitic acid, lauric acid, aluminum stearate, lead stearate, barium stearate, zinc stearate, zinc palmitate, methyl hydroxystearate, and glycerol monohydroxystearate; and resins including, polyamide resins, polyester resins, epoxy resins, polyurethane resins, acrylic resins (e.g., polymethyl methacrylate, polyacrylamide, etc.), vinyl resins such as vinyl acetate resins, polyvinyl pyrrolidone, polyvinyl alcohol resins, polyvinyl chloride resins (e.g., vinyl chloride-vinylidene chloride copolymers, vinyl chloride-vinyl acetate copolymers, etc.), cellulose resins (e.g., methyl cellulose, ethyl cellulose, carboxymethyl cellulose, etc.), petroleum resins, rosin derivatives, coumaroneindene resins, terpene resins, novolak-type phenolic resins, polystyrene resins, polyolefin resins (e.g., polyethylene, polypropylene, polybutene, ethylene-vinyl acetate copolymers, etc.), polyethylene glycol resins, and elastomers, natural rubbers, styrene-butadiene rubbers, isoprene rubbers, etc. These known waxes or resins may be used singly or as a mixture of two or more species, as desired In the present invention, there may preferably be used a binder having a softening point of 60°-130° C., more preferably 70°-110° C., according to the "ring and ball" method (JIS K 2207). Further, 100 parts of the binder used in the present invention may preferably comprise 50 parts or more of a resin component.

Figure 8:
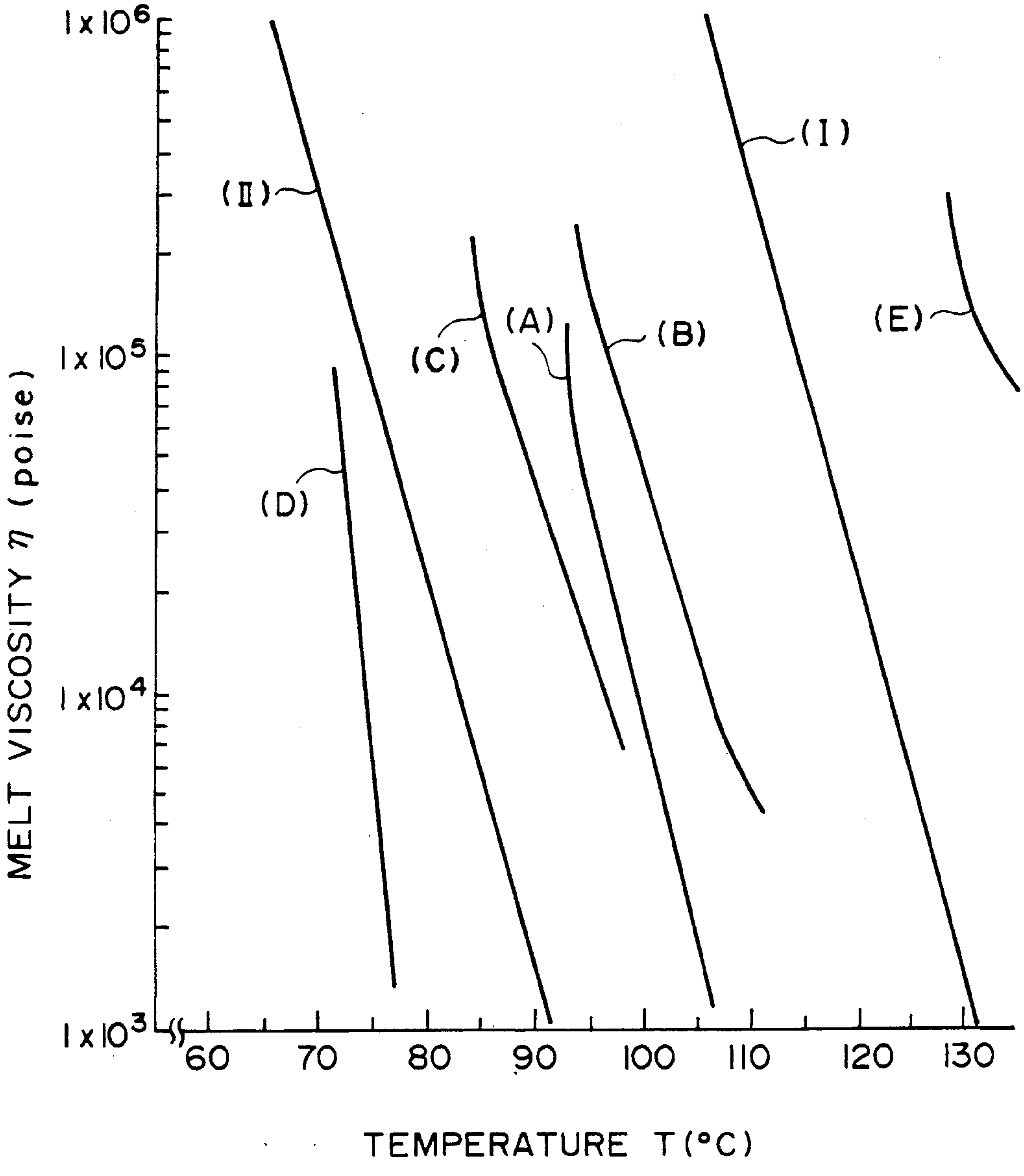
FIG. 8 is a graph showing relationships between temperature and the melt viscosities of the binders used in Examples and Comparative Examples appearing hereinafter.

In the present invention, the binder showing the above-mentioned melt viscosity characteristic may for example be selected from those having a certain melt viscosity in the above-mentioned melt viscosity ranges corresponding to the respective temperatures (i.e., 50° C., 60° C., 110° C. and/or 150° C.), or may be obtained by appropriately combining a wax component (which generally shows a large change in melt viscosity with respect to a temperature change as shown in the graph (D) in FIG. 8 appearing hereinafter) with a resin component (which generally shows a small change in melt viscosity with respect to a temperature change and/or a relatively high softening point as shown in the graph (E) in FIG. 8 appearing hereinafter).

In the present invention, various dyes or pigments may be used as the colorant. Specific examples of such colorant may include one or more of known dyes or pigments such as carbon black, Nigrsin dyes, lamp black, Sudan Black SM, Fast Yellow G, Benzidine Yellow, Pigment Yellow, Indo Fast Orange, Irgadine Red, Paranitroaniline Red, Toluidine Red, Carmine FB, Permanent Bordeaux FRR, Pigment Orange R, Lithol Red 2G, Lake Red C, Rhodamine FB, Rhodamine B Lake, Methyl Violet B Lake, Phthalocyanine Blue, Pigment Blue, Brilliant Green B, Phthalocyanine Green, Oil Yellow GG, Zapon Fast Yellow CGG, Kayaset Y963, Kayaset YG, Smiplast Yellow GG, Zapon Fast Orange RR, Oil Scarlet, Smiplast Orange G, Orazole Brown G, Zapon Fast Scarlet CG, Aizen Spiron Red BEF, Fastgen Blue 5007, Sudan Blue,and Oil Peacock Blue.

The colorant may preferably be contained in the ink layer in an amount of 1-50%, more preferably 5-35%, based on the weight of the ink layer. If the the colorant content is smaller than 1%, the image density of a recorded image becomes low. On the other hand, the colorant content exceeds 50%, there can occur undesirable problems such as increase in recording energy and decrease in the transferability of the ink layer.

In the present invention, all the component (except for the colorant) constituting the ink layer 1*b* may preferably be heat-fusible in order to prevent a decrease in transferability of the ink. In other words, it is preferred that the ink layer 1*b* used in the present invention contains substantially no components which are not heat-fusible, except for the colorant.

The ink layer 1*b* may preferably have a thickness of 1-25 microns, more preferably 3-15 microns. If the thickness of the ink layer is smaller than 1 micron, it is difficult to obtain a sufficient image density, when the value of N (i.e., an integer of 2 or larger) becomes large in double density recording. If the thickness exceeds 25 microns, there can occur undesirable problems such as peeling of the ink layer from the support and increase in recording energy.

Figure 7:
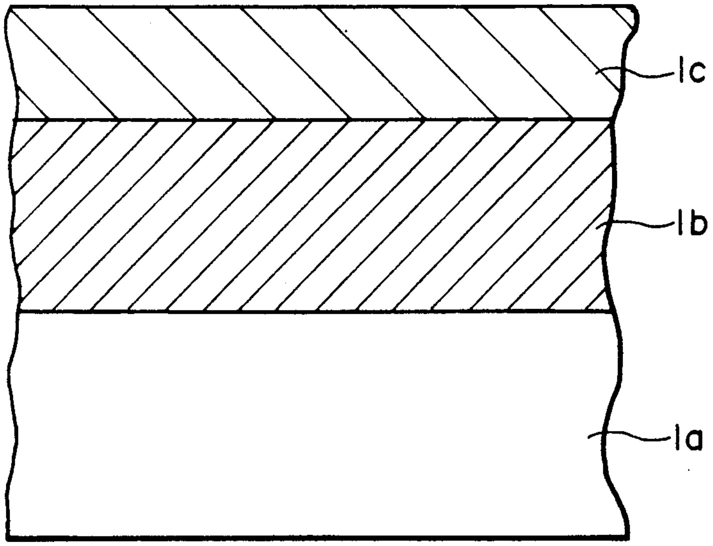
FIG. 7 is a partial schematic sectional view showing another embodiment of the thermal transfer material according to the present invention.

In the present invention, the thermal transfer material 1 may further comprise, as desired, an anti-staining layer 1*c* disposed on the ink layer 1*b* containing a colorant, as shown in FIG. 7. The anti-staining layer may preferably contain no colorant or only a slight amount of a colorant. The anti-staining layer 1*c* may be provided in order to prevent staining or soiling (i.e., ground staining) which can occur in the non-recorded portion of a recording medium, because the ink layer surface; in both of the heat-applied and non-heat-applied portions of a thermal transfer material, is rubbed with the recording medium surface in the double density recording.

Such an anti-staining layer can be caused to have a function such that it covers or fills the surface concavities of a recording medium in the form of a film in double density recording. The colorant content of the anti-staining layer may preferably be 10% or less, more preferably 5% or less. Further, the ratio of (colorant content (wt. %) of the anti-staining layer)/(colorant content (wt. %) of the ink layer) may preferably be ⅓ or less, more preferably 1/5 or less. The anti-staining layer 1*c* may preferably have a thickness of 1-20 microns, more preferably 1-10 microns.

The material constituting the anti-staining layer 1*c* can be the same as the binder constituting the above-mentioned ink layer 1*b* , but the binder of the anti-staining layer may preferably be one which has a softening point which is (preferably 5° C. or more) lower than that of the ink layer 1*b*. Further, the binder of the anti-staining layer may preferably be substantially non-adhesive at room temperature (25° C.). When the anti-staining layer 1*c* is not provided, it is preferred to use a binder having a large cohesion at room temperature, as the binder for the ink layer 1*b*.

As the support 1*a*, known plastic films or papers may be used. In the double density recording, however, since the same portion of the thermal transfer material is supplied with heat plural times as explained with reference to FIGS. 2 to 5, a support having high heat resistivity such as aromatic polyamide film and capacitor paper may preferably be used. When there is used a polyester film (particularly, a polyethylene terephthalate film, i.e., PET film) which has suitably been used for thermal transfer materials conventionally, it is preferred to dispose a layer of a heat-resistant material as a back coating layer, on the surface of the film to be heated.

The support 1*a* may preferably have a thickness of 3-20 microns, more preferably 4—12 microns. if a sufficient heat resistance and a strength are attained, a support can be thinner than 3 microns. Too thick a support is not desirable because the heat conductivity becomes inferior.

The thermal transfer material of the present invention may be obtained in the following manner.

For example, the binder which has been selected in consideration of the above-mentioned viewpoint is dissolved in an organic solvent such as toluene, methyl ethyl ketone, isopropyl alcohol, methanol and xylene, a colorant is then mixed in the resultant solution and sufficiently dispersed by means of a dispersing machine such as sand mill, and the thus obtained coating liquid is applied onto a support by a coating method such as bar coating and gravure coating. Alternatively, the binder is heated up to a temperature of above the softening point thereof, a colorant is dispersed or dissolved therein and the resultant mixture is applied onto a support by a so-called hot-melt coating. Further, the binder and colorant may be formed into an aqueous emulsion by the addition of a dispersant such as a surfactant, and the aqueous emulsion may be applied to form an ink layer.

Hereinbelow, the present invention will be explained more specifically while referring to specific examples of practice.

EXAMPLE 1

| <Ink 1> | |
|---|---|
| Polyamide resin obtained by a polycondensation reaction of polymerized fatty acid and diamine (acid value = 4, amine value = 2, softening point = 108° C.) | 40 parts |
| Carbon black (MA-11, mfd. by Mitsubishi Kasei K.K.) | 7 parts |
| Black dye (Valifast Black #3820, mfd. by Orient Kagaku K.K.) | 10 parts |
| Toluene/isopropyl alcohol (7/3) | 60 parts |

The above ingredients were mixed by means of a sand mill at 2,000 rpm for one hour to prepare an ink 1. The thus prepared ink 1 was applied onto a 4 micron-thick aromatic polyamide film by means of a wire bar and then dried to form a 7 micron-thick ink layer, whereby a thermal transfer material (I) having a structure as shown in FIGS. 2 to 5 was obtained. The above-mentioned polyamide resin used in the ink showed a relationship between temperature and melt viscosity as shown by a graph (A) in FIG. 8, according to Flow Tester measurement.

EXAMPLE 2

| <Ink 2> | |
|---|---|
| Polyester resin (Atlack 382A, mfd. by Kao K.K.) | 40 parts |
| Carbon black (MA-11, mfd. by Mitsubishi Kasei K.K.) | 7 parts |
| Black dye (Valifast Black #3820, mfd. by Orient Kagaku K.K.) | 10 parts |
| Methyl ethyl ketone | 60 parts |

The above ingredients were mixed by means of a sand mill at 2,000 rpm for one hour to prepare an ink 2. The thus prepared ink 2 was applied onto a 4 micron-thick aromatic polyamide film by means of a wire bar and then dried to form a 7 micron-thick ink layer, whereby a thermal transfer material (II) having a structure as shown in FIGS. 2 to 5 was obtained. The above-mentioned polyester resin used in the ink showed a relationship between temperature and melt viscosity as shown by a graph (B) in FIG. 8, according to Flow Tester measurement.

EXAMPLE 3

The above-mentioned ink 2 was applied onto a 4 micron-thick aromatic polyamide film by means of a wire bar and then dried to form a 7 micron-thick ink layer.

| <Ink 3> | |
|---|---|
| Terpene-phenol resin (YS Polyester T-80, mfd. by Yasuhara Yushi K.K.) | 40 parts |
| Toluene | 60 parts |

Separately, the above ingredients were mixed to sufficiently dissolve the resin in toluene to prepare an ink 3. The thus prepared ink 3 was applied onto the above-mentioned ink layer by means of a wire bar and then dried to form a 3 micron-thick transparent layer (i.e., anti-staining layer), whereby a thermal transfer material (III) having a structure as shown in FIG. 7 was obtained. The above-mentioned terpenephenol resin used in the transparent layer showed a relationship between temperature and melt viscosity as shown by a graph (C) in FIG. 8, according to Flow Tester measurement.

EXAMPLE 4

The thermal transfer material (IV) having a structure as shown in FIG. 7 was obtained in the same manner as in Example 3, except that a 6 micron-thick capacitor paper was used as a support instead of the aromatic polyamide film.

COMPARATIVE EXAMPLE 1

| <Ink 4> | |
|---|---|
| Carnauba wax aqueous dispersion | 80 parts |
| Carbon black aqueous dispersion | 20 parts |
| Fluorine-containing surfactant | 1 part |

(The amounts of aqueous dispersions for providing an ink formulation in this example are all expressed based on their solid contents.)

The above ingredients were sufficiently mixed to prepare an ink 4. The thus prepared ink 4 was applied onto a 4 micron-thick aromatic polyamide film by means of a wire bar and then dried to form a 7 micron-thick ink layer, whereby a thermal transfer material (V) was obtained. The above-mentioned carnauba wax used in the ink showed a relationship between temperature and melt viscosity as shown by a graph (D) in FIG. 8, according to Flow Tester measurement.

EXAMPLE 5

| <Ink 5> | |
|---|---|
| Polyvinyl butyral resin (S-LEC BLS, mfd. by Sekisui Kagaku K.K.) | 40 parts |
| Carbon black (MA-11, mfd. by Mitsubishi Kasei K.K.) | 7 parts |
| Black dye (Valifast Black #3820, mfd. by Orient Kagaku K.K.) | 10 parts |
| Methyl ethyl ketone | 160 parts |

The above ingredients were mixed by means of a sand mill at 2,000 rpm for one hour to prepare an ink 5. The thus prepared ink 5 was applied onto a 4 micron-thick aromatic polyamide film by means of a wire bar and then dried to form a 7 micron-thick ink layer, whereby a thermal transfer material (VI) was obtained. The above-mentioned polyvinyl butyral resin used in the ink showed a relationship between temperature and melt viscosity as shown by a graph (E) in FIG. 8, according to Flow Tester measurement.

Each of the thermal transfer materials (I) to (VI) prepared above was slit into ribbon forms having a width of 6.35 mm, which were then connected to form a long ribbon. The thus obtained ribbon of the thermal transfer material was loaded in a Japanese language word processor, Canoward-Mini $\alpha$-20, and double density recording was effected on a recording paper. The feed rate of the ribbon was changed by directly connecting a DC motor with a supplying core disposed in a ribbon cassette, and regulating the rotating speed of the motor. The resultant recorded images were evaluated with respect to those obtained when the feed rate (or length of travel) of the ribbon was 1/5 times that of the recording paper.

With respect to the thermal transfer materials (I) to (IV) according to the present invention, the resultant recorded images showed uniform densities and good edge-cutting. Particularly, the transfer materials (III) and (IV) did not provide ground staining at all.

On the other hand, with respect to the thermal transfer material (V) obtained in Comparative Example 1, the resultant recorded image showed a high image density only in the head or front portion thereof but the other portion was white-dropped such that paper fibers were clearly observed. Further, ground staining or soiling occurred. In this case, when the recording energy was decreased, the transferability of the thermal transfer material (V) was deteriorated and only a recorded image having some defects was provided.

With respect to the thermal transfer material (VI) obtained in Comparative Example 2, the recording energy was required to be increased, and therefore the energy supplied from the thermal head was increased in an attempt to obtain a recorded image without a defect. However, the thermal head was broken and the support of the thermal transfer material was also holed to be cut, before the defect was completely obviated.

As described hereinabove, when the thermal transfer material according to the present invention is used, recorded images of good quality are obtained in double density recording, whereby the running cost in thermal transfer recording can be reduced. Further, the thermal transfer material according to the present invention can be used in recording for a period of time which is N times that for the conventional thermal transfer material having the same length, and the frequency of exchange thereof may be reduced.

What is claimed is:

1. A thermal transfer material, comprising a support and an ink layer disposed thereon which comprises a binder and a colorant; said binder having a melt viscosity ($\eta$ poise) satisfying the following formula:

$$1.9\times 10^{13}\cdot e^{-0.26T} \leq \eta \leq 4.8\times 10^{17}\cdot 3^{-0.26T},$$

wherein T denotes a temperature (°C.) and e denotes the base of natural logarithm, in the range of 50–150° C.; and said thermal transfer material is capable of recording on a recording medium when both said thermal transfer material and said recording medium are moved past a recording head, during said recording said thermal transfer material being moved in a unit time more slowly than said recording medium so as to effect relative motion between said thermal transfer material and said recording medium.

2. A thermal transfer material according to claim 1, wherein said ink layer contains 1–50 wt. % thereof of the colorant.

3. A thermal transfer material according to claim 1, wherein said ink layer contains 5–35 wt. % thereof of the colorant.

4. A thermal transfer material according to claim 1, which further comprises an anti-staining layer disposed on the ink layer.

5. A thermal transfer material according to claim 4, wherein said anti-staining layer has a thickness of 1–20 microns.

6. A thermal transfer material according to claim 5, wherein said anti-staining layer has a thickness of 1–10 microns.

* * * * *

UNITED STATES PATENT AND TRADEMARK OFFICE

CERTIFICATE OF CORRECTION

PATENT NO. : 5,049,903

DATED : September 17, 1991

INVENTOR(S) : Takayuki Suzuki

It is certified that error appears in the above-indentified patent and that said Letters Patent is hereby corrected as shown below:

IN [57] ABSTRACT

Line 6, "denoted" should read --denotes--.

COLUMN 1

Line 60, "et. seq." should read --et seq.--.

COLUMN 2

Line 14, "presentn" should read --present--.
Line 16, "according to" should be deleted.
Line 17, "claim 1" should be deleted.

COLUMN 3

Line 58, "to" (first occurrence) should be deleted.

COLUMN 5

Line 30, "$\eta$is" should read --$\eta$ is--.
Line 54, "($\eta$poise)" should read --($\eta$ poise)--.

COLUMN 6

Line 42, "Nigrsin" should read --Nigrosin--.
Line 60, "hand, the" should read --hand, if the--.
Line 64, "component" should read --components--.

COLUMN 7

Line 59, "if" should read --If--.

UNITED STATES PATENT AND TRADEMARK OFFICE

CERTIFICATE OF CORRECTION

PATENT NO. : 5,049,903

DATED : September 17, 1991

INVENTOR(S) : Takayuki Suzuki

It is certified that error appears in the above-indentified patent and that said Letters Patent is hereby corrected as shown below:

COLUMN 9

Line 21, "terpenephenol" should read --terpene-phenol--.

COLUMN 10

Line 61, "$1.9\times10^{13}\cdot e^{-0.26T}\leqq\eta\leqq4.8\times10^{17}\cdot3^{-0.26T}$," should read --$1.9\times10^{13}\cdot e^{-0.26T}\leqq\eta\leqq4.8\times10^{17}\cdot e^{-0.26T}$,--.

COLUMN 12

Line 10, "claim 5," should read --claim 4,--.

Signed and Sealed this

Thirteenth Day of July, 1993

Attest:

Michael K. Kirk

MICHAEL K. KIRK

Attesting Officer

Acting Commissioner of Patents and Trademarks